United States Patent
Hurtis et al.

(10) Patent No.: US 6,557,646 B1
(45) Date of Patent: May 6, 2003

(54) MULCH-TILL RIPPER

(75) Inventors: Paul A. Hurtis, Mackinaw, IL (US); Joseph M. Keeler, Newton, IA (US); Timothy R. Blunier, Goodfield, IL (US); Marvin D. Kuebler, Goodfield, IL (US)

(73) Assignee: Case, LLC, Racine, WI (US)

( * ) Notice: Subject to any disclaimer, the term of this patent is extended or adjusted under 35 U.S.C. 154(b) by 0 days.

(21) Appl. No.: 10/068,327

(22) Filed: Feb. 6, 2002

(51) Int. Cl.$^7$ ............................................. A01B 13/08
(52) U.S. Cl. ................. 172/156; 172/178; 172/180; 172/182; 172/196; 172/604; 172/699; 172/771
(58) Field of Search ................. 172/156, 178, 172/180, 182, 196, 604, 699, 771

(56) References Cited

U.S. PATENT DOCUMENTS

| 4,245,706 A | 1/1981 | Dietrich, Sr. ............... 172/180 |
| 4,403,662 A | 9/1983 | Dietrich, Sr. ............... 172/156 |
| 4,492,272 A | 1/1985 | Jensen ......................... 172/178 |
| 4,538,689 A | 9/1985 | Dietrich, Sr. ............... 172/700 |
| 5,080,178 A | 1/1992 | Dietrich, Sr. ............... 172/153 |
| 5,156,216 A | 10/1992 | Van Mill ..................... 172/138 |
| 5,462,123 A | 10/1995 | Harlan et al. ............... 172/454 |
| 5,590,721 A | 1/1997 | Van Mill ..................... 172/138 |

*Primary Examiner*—Christopher J. Novosad
(74) *Attorney, Agent, or Firm*—Rebecca Henkel

(57) ABSTRACT

An agricultural tillage implement employing a series of apparatus to perform one-pass primary tillage is disclosed. A cutting disk is the first apparatus that works the field. These disks cut the residue laterally (across the machine) and mix the majority of the residue throughout the disk tillage profile. Additional conditioning occurs by knocking residue/stalks over into a prone position with large cast spools between each disk for quicker decay. Next, chisel plow units work the soil to fracture and loosen the soil, providing proper soil aggregate size and air pore space relationship throughout the shank tillage profile. The last apparatus to work the field is a set of leveling disks, or a combination of leveling disks and a rotary reel/drag harrow. The function of these will provide is to reduce clod size and leave the soil level and smooth enough to allow one-pass secondary tillage in the spring.

17 Claims, 5 Drawing Sheets

MULCH-TILL RIPPER

BACKGROUND OF THE INVENTION

The present invention relates generally to an agricultural tillage implement, and more particularly to such an implement that provides a tillage system using a combination of cutting disks, tillage points, and leveling disks, with or without a drag harrow or rotary reels, which accomplishes complete primary tillage in one pass. This single pass provides an approach to crop residue management that is more cost-effective than past practices, improves soil tilth, yet requires the least operator time, and still leaves fall surface conditions (roughness) that are level and smooth enough to allow the application of chemicals prior to any additional tillage and allows one pass secondary tillage for a truly planter-ready seedbed.

Single-pass tillage implements providing both shallow and primary tillage in a single pass using disks and chisel points are disclosed in U.S. Pat. Nos. 4,245,706; 4,403,662; and 4,538,689. These machines, however, leave furrows and/or ridges in the soil after use. It has become desirable to leave the surface of the soil as level as possible after tilling in the fall to reduce the amount of soil preparation necessary before planting the following spring. U.S. Pat. No. 5,080,178 discloses a disk leveler for use with a tillage machine such as is disclosed in U.S. Pat. No. 4,403,662.

During the late 1970's, before the machine shown in U.S. Pat. No. 4,403,662 became available, primary tillage was accomplished principally with moldboard plows. The moldboard plow leaves large slabs and chunks of soil that tend to break down during the freeze and thaw cycles of winter, but this type of plowing requires substantial working of the soil in the spring in order to level the field and prepare it for planting of the next crop. Moreover, moldboard plowing is not an effective remedy for soil erosion, and actually has a tendency to exacerbate this problem.

In recent years, farmers have been looking for ways to decrease soil and wind erosion. The use of a large disk assembly in front of a chisel plow on a parabolic shank has gone a long way toward accomplishing these objectives and also breaks up the hard plow pan (or "sole") that is created at the particular depth at which the plow is set to operate, caused by repeated tillage at the same depth over the years. The parabolic shank and winged point do reduce soil erosion, but this practice also may create large chunks of soil, and usually requires substantial spring soil working to prepare an adequate seedbed for planting.

During the 1970's, the cutter chisel was widely used. It consisted of a chisel plow with a row of coulters to cut the residue ahead of two rows of staggered shanks on thirty-inch centers. These shanks had a four-inch twisted point attached to them to perform the primary tillage. The tip of the point was at approximately a 45° angle to the horizontal, sloping downwardly and forwardly from the shank. The worked soil followed the curvature of the generally C-shaped shank that was attached to the chisel plow and was twisted in order to provide a moldboard-type turning action. A C-shaped shank, of the type described, is shown in U.S. Pat. No. 4,403,662.

For early cutter chisel plows, there was a net lateral movement of soil. A machine with, for example, eleven shanks would be equipped with five right-hand and six left-hand twisted points. The result was that a wide groove and a large berm were left after a pass. The machine as shown in U.S. Pat. No. 4,403,662 was an improvement because it left a smaller groove and not as large a berm by using fore-and-aft sets of disks and an improved point.

In U.S. Pat. No. 4,538,689, there is disclosed a winged point mounted on a parabolic shank. That winged point, in the combination shown, creates a large, rough surface similar to the surface of the moldboard plow used during the late 1970's and early 1980's. The wings on these points are set at a soil lift angle of approximately 30°. This lift angle was conventional at the time, but it is an aggressive angle that causes the wings to lift the soil abruptly. In some soils, particularly more compacted soils, the combination of an aggressive lift angle on the wings of the point, together with a parabolic shank, which is designed to lift and heave soil, lifted larger soil chunks and threw them out of the paths of the chisel plow and away from cooperating disks, making it difficult to create a level soil surface after a pass of the machine.

During the 1980's, farmers desired less tillage to prepare for planting. The furrows left by the chisel shanks had to be filled with the berms that were created between each shank. In order to fill these furrows behind large parabolic shanks, smaller shanks were placed to run shallower and were located midway between the larger chisel shanks. This resulted in smaller grooves on reduced centers. With the development of the disk leveler shown in U.S. Pat. No. 5,080,178, the furrows behind the shanks were substantially filled without leaving sizeable grooves after the shanks had passed, thus improving the levelness or "smoothness" of the surface.

As today's farming operators are trying to combine multiple tillage operations into fewer passes, while maintaining or improving yields and reducing erosion, Crop Residue Management (CRM) has become a well accepted practice. CRM is a year-round system beginning with the selection of crops that produce sufficient quantities of residue and may include the use of cover crops after low residue producing crops. CRM includes all field operations that affect residue amounts, orientation and distribution throughout the period requiring protection. Tillage systems included under CRM are no-till, ridge-till, mulch-till and reduced-till. A change in tillage and planting operations to increase crop residues on the soil surface has been shown to produce crop yields generally equal to or higher than those produced by systems that leave little or no residue on the field after planting. Additionally, more residue means fewer trips across the field, which translates to lower fuel bills, less soil compaction, and less wear and tear on equipment.

SUMMARY OF THE INVENTION

It is an object of the instant invention to provide an agricultural tillage implement employing a series of apparatus to perform one-pass primary tillage. A cutting disk is the first apparatus that works the field. These disks cut the residue laterally (across the machine) and mix the majority of the residue throughout the disk tillage profile. Additional conditioning occurs by knocking residue/stalks over into a prone position with large cast spools between each disk for quicker decay. Next, chisel plow units work the soil to fracture and loosen the soil, providing proper soil aggregate size and air pore space relationship throughout the shank tillage profile. The last apparatus to work the field is a set of leveling disks, or a combination of leveling disks and a rotary reel/drag harrow. The function of these will provide is to reduce clod size and leave the soil level and smooth enough to allow one-pass secondary tillage in the spring. As used herein, primary tillage means deep soil plowing, in an approximate range of nine to fourteen inches or greater. Secondary tillage may be in an approximate range of three to six inches. Finally, a leveler smoothes the surface behind the chisel plow units.

Various previous inventions incorporate the disk-ripper-disk configuration on one machine, but are unable to provide superior leveling and field finish in a wide range of conditions and speeds due to design deficiencies that provide limited operation efficiencies and/or agronomic field output. The operator has had a choice to run slow and do a somewhat adequate agronomic job or run fast (more efficient) and degrade the agronomic performance. These previous inventions using conventional disk blades create too much lateral soil movement causing fields to be uneven, especially at varied and increased speeds over 5.5 mph. These conventional leveling blade designs are inefficient at cutting and penetrating due to deeper blade concavity (where deep concavity is defined by the ratio R/D<1.3, where R is the radius of curvature and D is the diameter, both of the disk blade, and tend to throw large mounts of soil laterally. Managing the amount of soil throw is the key to providing higher speed primary tillage with high quality output as defined by a level surface finish.

This type of machine is possibly the most economical configuration available for mulch-tillage application since it combines the operation of a tandem disk with a v-ripper to achieve crop residue management, soil tilth, and seedbed conditioning in one pass. However, an improvement in the fundamental design disclosed herein is necessary to eliminate the compromise between operation efficiency and agronomic field output.

It is an object of this invention to provide an agricultural tillage implement that may be used for primary tillage.

It is another object of the instant invention to provide an agricultural tillage implement that allows proper sizing of soil and residue in one pass, giving uniform distribution of soil and residue for subsequent passes.

It is a further object of the instant invention to provide an agricultural tillage implement that is designed to perform complete tillage of the soil in a single pass while leaving a fairly level surface to reduce the amount of soil preparation required for planting the next season.

It is a still further object of the instant invention to provide an agricultural tillage implement that supports the Crop Residue Management approach to farming.

It is an still further object of the invention to provide an implement that will prepare the crop residue for uniform incorporation into the soil profile while providing soil tilth maintenance (compaction elimination) and leave a level surface with small clods and uniform residue distribution for future planting preparation.

It is an even still further objection of this invention to employ shallow concavity front cutter disk blades to cut and mix soil and residue with optimizing horsepower required resulting in a lower draft primary tillage tool (shallow concavity is defined the ratio (R/D>1.5, R is the radius of curvature, D is the diameter, both for the disk blade).

These and other objects are obtained by providing an agricultural tillage implement employing a series of apparatus to perform one-pass primary tillage. A cutting disk is the first apparatus that works the field. These disks cut the residue laterally (across the machine) and mix the majority of the residue throughout the disk tillage profile. Additional conditioning occurs by knocking residue/stalks over into a prone position with large cast spools between each disk for quicker decay. Next, chisel plow units work the soil to fracture and loosen the soil, providing proper soil aggregate size and air pore space relationship throughout the shank tillage profile. The last apparatus to work the field is a set of leveling disks, or a combination of leveling disks and a rotary reel/drag harrow. The function of these will provide is to reduce clod size and leave the soil level and smooth enough to allow one-pass secondary tillage in the spring.

DETAILED DESCRIPTION OF THE PREFERRED EMBODIMENT

In general terms, on the new mulch-till ripper described herein the cutting disk blades in the front of the machine are designed with a shallow concavity (as defined below). These shallow concavity front blades facilitate maximum cutting and penetration with lower draft and vertical forces, and thereby lowering horsepower requirements. The result is optimal cutting and mixing of soil and residue while managing lateral soil throw, minimizing speed sensitivity and, very importantly, allowing operators to increase speeds to upwards of 7.5 mph. The outermost disk blade on either side is a step down on the diameter of approximately 2 inches to minimize blowout of soil. The cutting disk gang has an independent depth adjustment relative to the shanks and rear-leveling disk gangs that is accomplished by mechanical screw adjust or by optional hydraulics.

The chisel plow section contains parabolic shanks with wing point technology in a 7-inch point located on 30-inch centers. These shanks are located in a "v" or "w" pattern with the 7-inch winged point to achieve improved soil aggregate/pore size relationship through the depth of the tillage profile. Other points, shanks, and spacing could be used to achieve the desired soil tilth properties; however, a satisfactory wing point is shown in U.S. Pat. No. 4,538,689. Depth adjustment of the chisel plows is done with the main machine lift system and mechanical stops. An alternative winged point with a less abrupt lift angle is shown in U.S. Pat. No. 6,276,462.

Finally, rear leveling disk blades is utilized to level the surface profile by being offset from the path of the front cutting blades to create a uniform, full disk coverage path across the machine pass. These rear leveling blades have a deep concavity (R/D<1.3) that allows them to maximize lateral soil throw while minimizing the depth of penetration required. By moving the proper amount of soil laterally without running deep, this configuration optimizes surface finish without the appearance of large disk grooves and re-compacting the soil due to back wall disk blade pressure. These leveling blades also continue to diminish the size of the soil aggregate created by the tillage points, mix residue through the tillage soil profile, and level the field surface to minimize or eliminate the need for subsequent leveling passes. Adjacent to the inner and outermost disk blade on either side is a step down on the diameter of approximately 2 inches. The inner and outermost disk blade on either side is a step down on the diameter of approximately 4 inches. These step down blades provide proper feathering of soil to create a level surface finish, regardless of speed and soil type.

The leveling disk gangs may advantageously include small crimp center blades and cast spools to allow for maximum clearance between blades for flow of soil and residue. The rear leveling disk gang has an independent depth adjustment relative to the shanks or cutting disk gangs that is accomplished by mechanical screw adjust or by optional hydraulics. A drag harrow or rotary reel can be used if necessary with any of the above combinations to improve field surface finish and eliminate subsequent leveling passes allowing direct planting.

Figure 1:
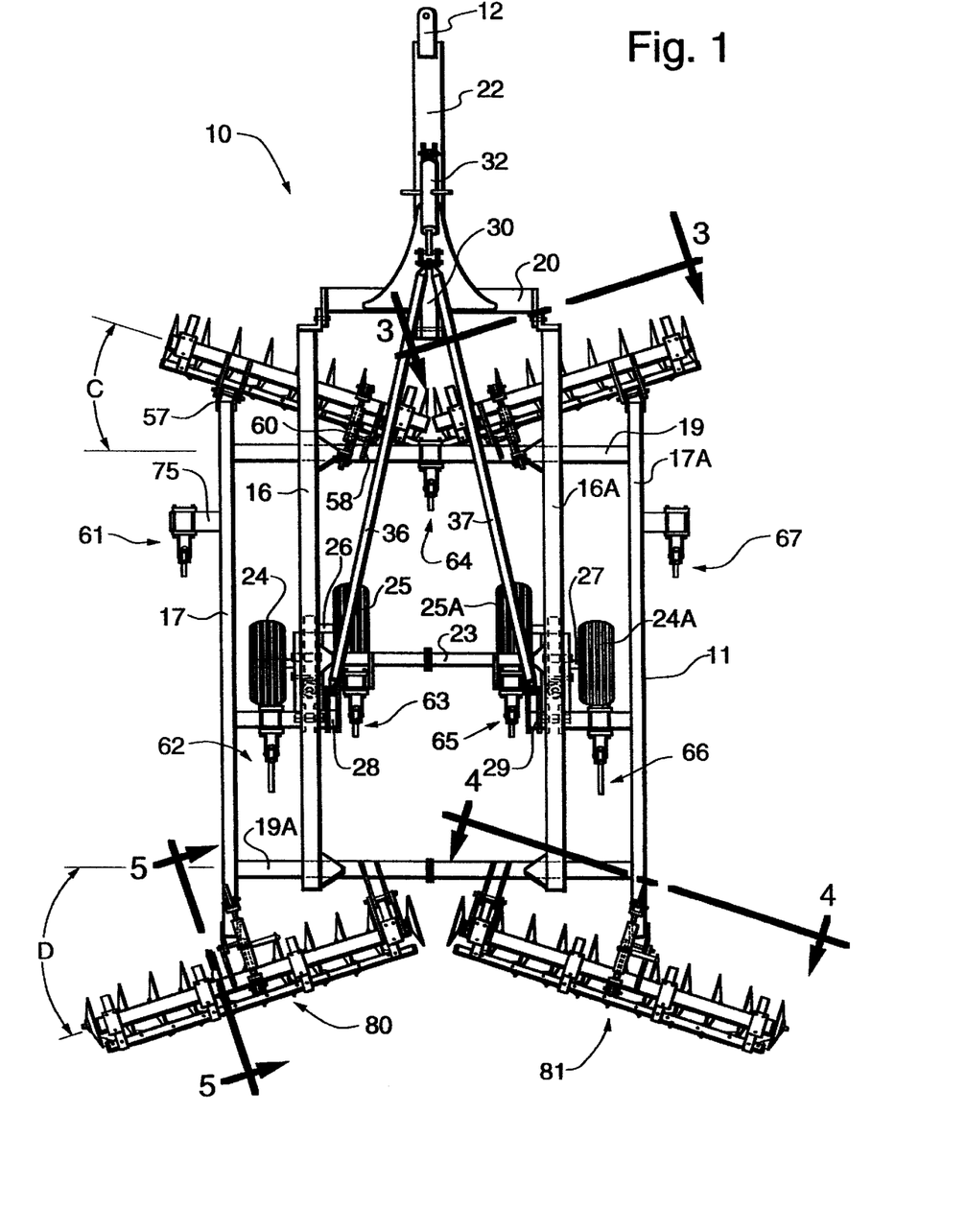
FIG. 1 is a top plan view of the tillage device of the instant invention.

Referring now to FIG. 1 for a more detailed description, reference numeral 10 generally designates the tillage implement of the instant invention. Implement 10 includes a rigid main frame generally designated 11 that is adapted to be attached at its front to the rear of an agricultural tractor by means of a conventional hitch 12, such as the single-strap pull, clevis style shown.

The main frame 11 includes first and second elongated inside frame members 16, 16A and first and second outside frame members 17, 17A. These inside and outside frame members are affixed to front and rear transverse support members 19, 19A. A third transverse support member 20 is pivotally interconnected to the forward ends of inside frame members 17, 17A, and provides support for a tongue 22. An additional frame member 23 interconnects the inside frame members about two-thirds along the length thereof to provide additional structural support for wheels, to be discussed further below. Welding, bolts and other fastening means securely interconnect this frame structure, creating a clean and simple design capable of handling tough soil and residue conditions. This design, which in practice is made primarily of 6 by 8-inch box beams, allows for longer life and durability, additional residue flow, and the weight necessary to penetrate the toughest soil conditions.

Frame 11 is supported for movement across a field or along a road by wheels 24, 24A, and 25, 25A that also serve as a means for controlling the depth of plowing, as will be discussed further below. The wheel structure that will be described uses generally known "walking-beam axles" that increase the machine's ability to float over wet or soft soil, provide a level ride over rough field conditions, and allow for smooth, agile transport. Wheel pairs 24, 25 and 24A. 25A are mounted on tandem axles 26 and 27, best seen in FIG. 2. The tandem axles are, in turn, connected centrally to a pivot pedestal (looking now, regarding this item, at the left hand unit, the right-hand unit being the same). A front link 30 is pivotally connected at one end to transverse member 20 by pivot pin 31 and at the other end to the rearward end of turnbuckle 32 by pivot pin 33. The forward end of turnbuckle 32 is pivotally connected to tongue 22 by pivot pin 34. A pair of long links 36,37 pivotally connect front link 30 with the respective pivot pedestals.

Figure 2:
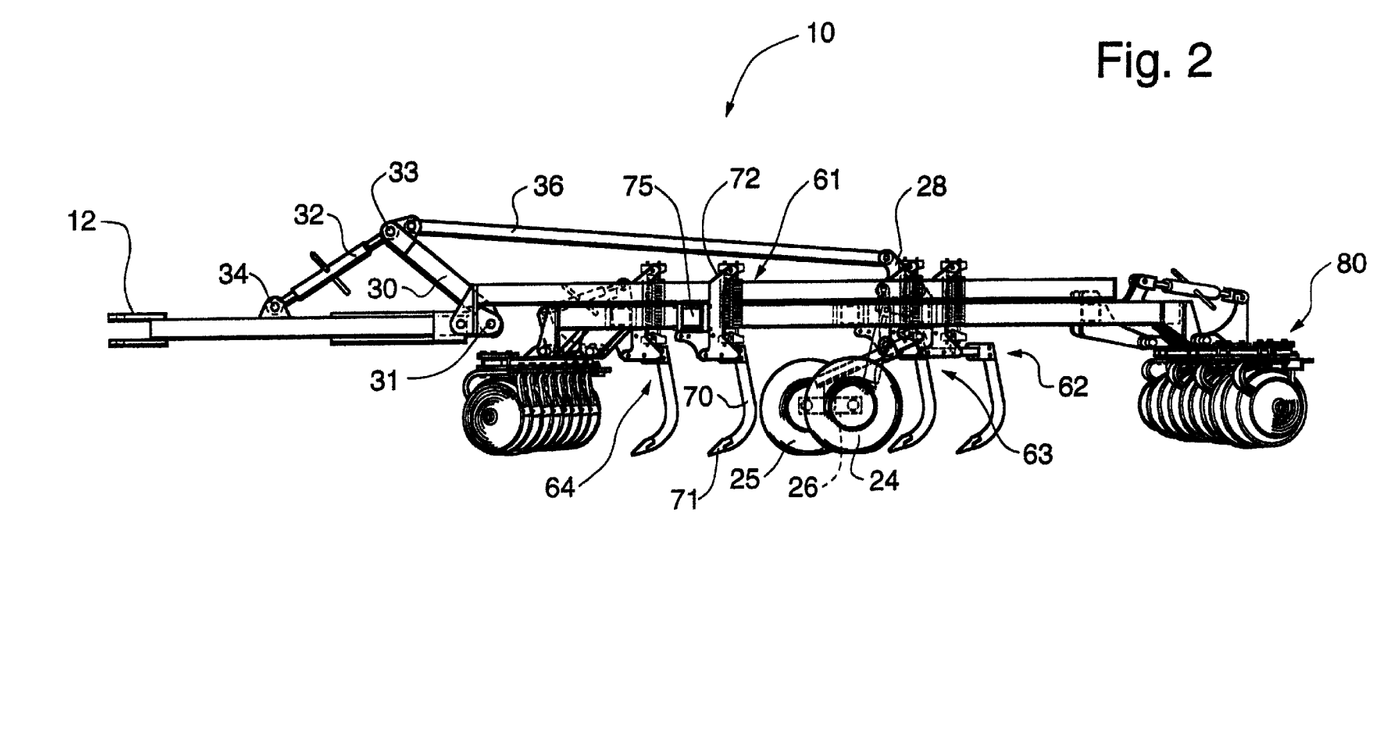
FIG. 2 is a left side elevational view of the tillage device shown in FIG. 1.

Raising or lowering the front of the main frame is accomplished by lengthening or shortening turnbuckle 32. As the turnbuckle is shortened, the long links 36, 37 and front link 30 move forward, pivoting around pivot pins 31, thus lowering the front of frame 11. Lengthening turnbuckle 32 causes the reverse movement to occur, i.e., raising the front of the frame. Hitch 12, tongue 22 and the elements described immediately above work together to create a constant level hitch. Without requiring a special wrench, the operator can simply twist the turnbuckle 32, matching the hitch 12 to the tractor's drawbar, and level the machine fore-and-aft. This feature holds the frame level for an even and consistent depth throughout the entire working range of the machine.

As best seen in FIG. 1, there are two cutter disk gangs at the forward end of the implement. These gangs are arranged in a "v" pattern with the outside end of each leading in the forward direction, i.e., the apex of the "v" is closer to the rear of the implement than the outside ends thereof. Since the sides of the machine, adjacent the longitudinal centerline of the implement, are mirror images, only one side will be described. The cutter disk blade angle, or working angle shown as angle C in FIG. 1, is set in the range of 17° to 19°, preferably 18° to maximize soil penetration and residue sizing, while reducing draft and compaction. This optimum angle, set side to side in a "v" position, also provides excellent residue incorporation without jeopardizing a level field finish.

Figure 3:
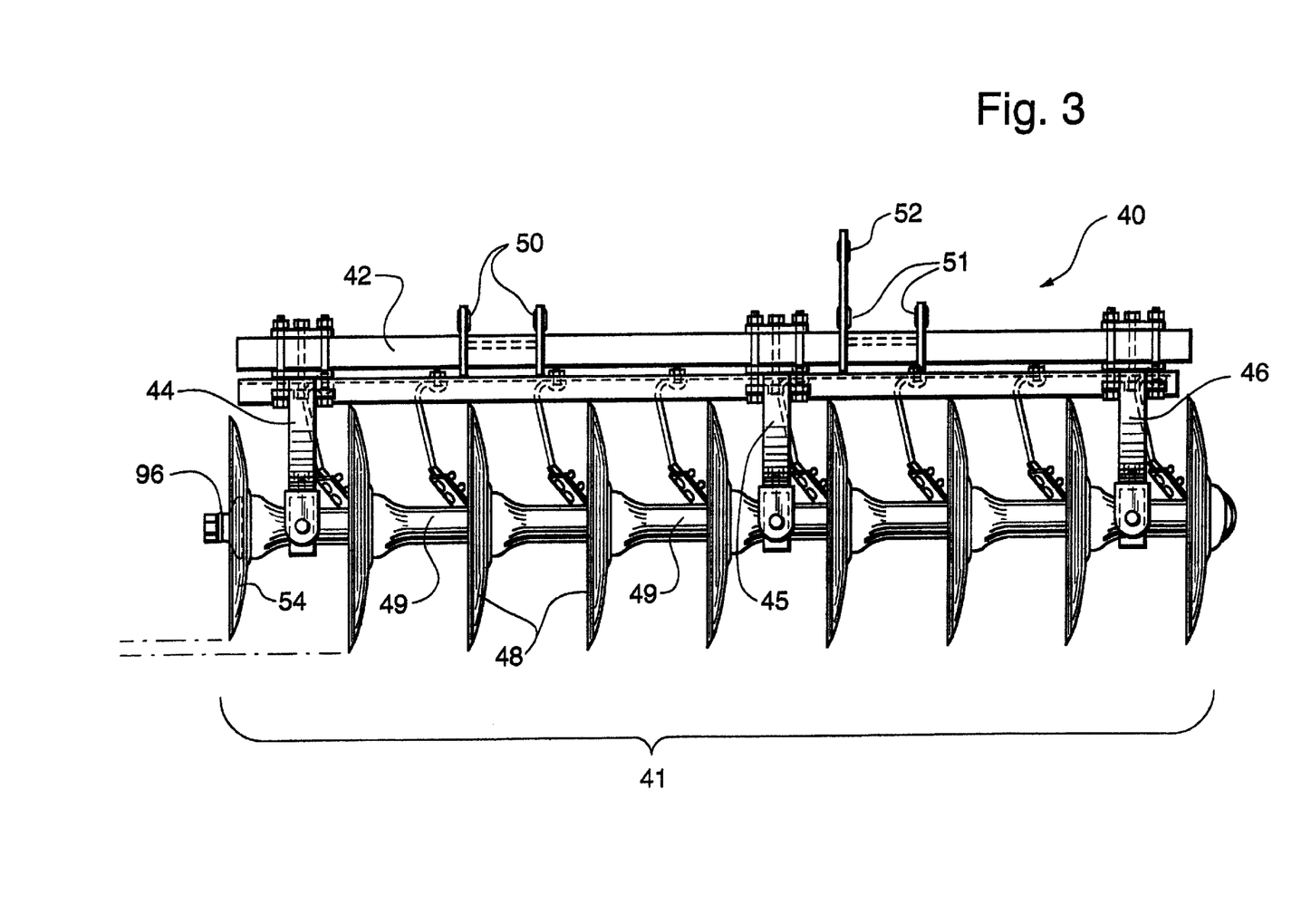
FIG. 3 is a front elevational view of the cutting disks of FIG. 1, taken along lines 3—3 thereof.

A disk frame 40, as seen best in FIG. 3, is suspended beneath the main frame 11 and adapted for vertical adjustment (under operator control). The cutter disk frame 40 is shown to comprise a disk assembly 41 rotatably connected to a rigid front gang tube 42 by three spring cushioned gang hangers 44–46. Disks 48 are mounted on an elongated shaft, bolted at each end, and separated by spools 49 in known manner. Two pair of tabs 50, 51 are attached to gang tube 42 and allow, as will be discussed below, selective independent rotation of disk frame 40 relative to main frame 11. One tab of pair 51 is longer than the other, and includes an additional pivot point 52.

Disks 48 and disk 54 are all shallow concavity cutting disk blades to better cut and mix soil and residue with optimization of horsepower requirements—resulting in a lower draft primary tillage implement. Shallow concavity is defined by the ratio R/D>1.5, where R is the radius of curvature and D is the diameter, both of the disk blade. Disk 54 is a "feathering" disk with a diameter generally 2 inches less than that of disks 48. This feathering disk is on the outermost end of the gang, and prevents excessive blowout of soil and crop residue, and is thus a significant contributor to providing higher speed primary tillage with high quality output—as defined by a level surface finish.

Cutter disk frame 40 is suspended beneath main frame 11 at tabs 50, 51 by mating pivot tabs 57, 58. The disk frame 40 is pivotably adjustable about the pivot tabs by a turnbuckle 60 connected at one end to pivot point 52 and to the main frame at the other. As will be discussed below, the rear disks are also vertically adjustable. Mechanical independently adjustable disk gang depth allows for fine-tuning the machine, by changing the disk gang depth independent of the shanks, to match the most diverse farming practice and speed requirements.

The preferred embodiment includes seven chisel plow units 61–67 arranged, as can be seen best in FIGS. 1 and 2, in a "w" pattern. The structure of the seven chisel plow units may include conventional sweeps and shanks. However, plows having narrow, rigid shanks and winged points are preferred, and one winged point (shown in U.S. Pat. No. 6,276,462) is believed to be of particular advantage. Still referring to FIGS. 1 and 2, the plow units are identical, so only unit 61 will be disclosed in further detail. In that unit, a parabolic shank 70, with a replaceable chisel point 71 affixed thereto, is attached to spring assembly 72. The spring assembly is, in turn, affixed to frame member 75. The chisel plow unit works in a conventional manner in that the shank fractures and loosens the soil in the 8-inch to 14-inch range, providing proper soil aggregate size and pore space relationship throughout the shank tillage profile, but may move rearwardly against the force of the spring assembly if a significant obstacle is encountered.

Following the chisel plows are two gangs of leveling disks 80, 81. Each gang includes a plurality of disks that do not till the soil in any significant manner, as do the forward cutting disks. That is, the leveling disks are set at a depth such that under normal conditions, their bottom edges do not engaged untilled soil to any continuous and substantial extent. Rather, the leveling disks operate near the original soil level; and they primarily level the soil and residue already tilled and mounded by the cutting disks and chisel plows, leaving the surface of the soil level without the need for substantial additional tillage before planting.

Figure 4:
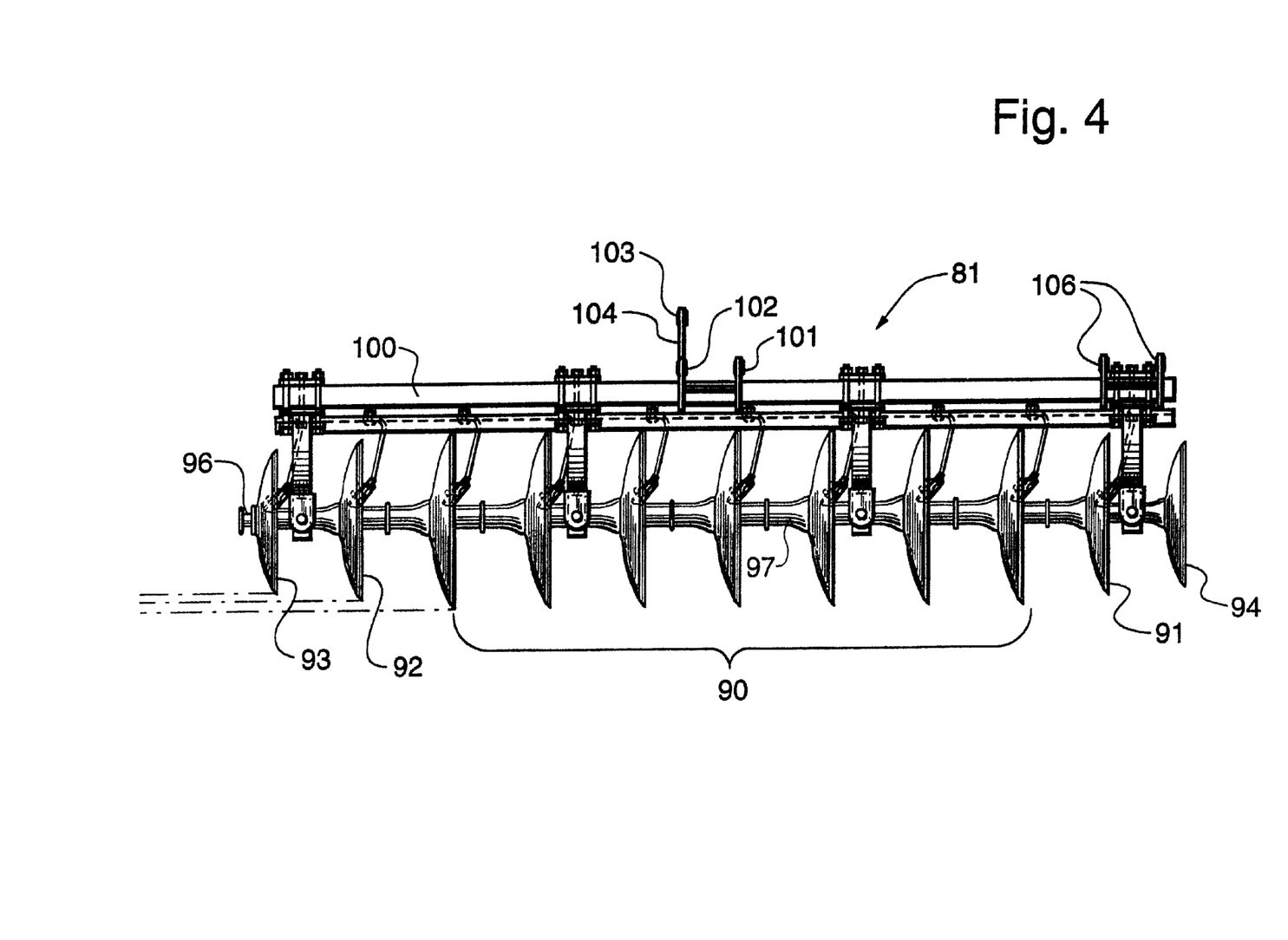
FIG. 4 is a front elevational view of the leveling disks of FIG. 1, talking along lines 4—4 thereof.
Figure 5:
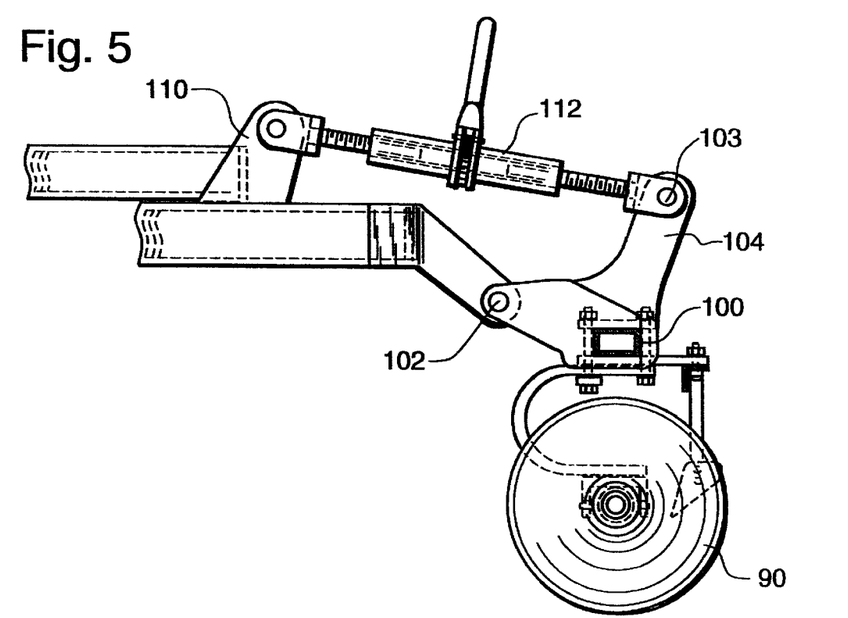
FIG. 5 is a cross-sectional view of the leveling disk, taken long line 5—5 of FIG. 1.
Figure 6:
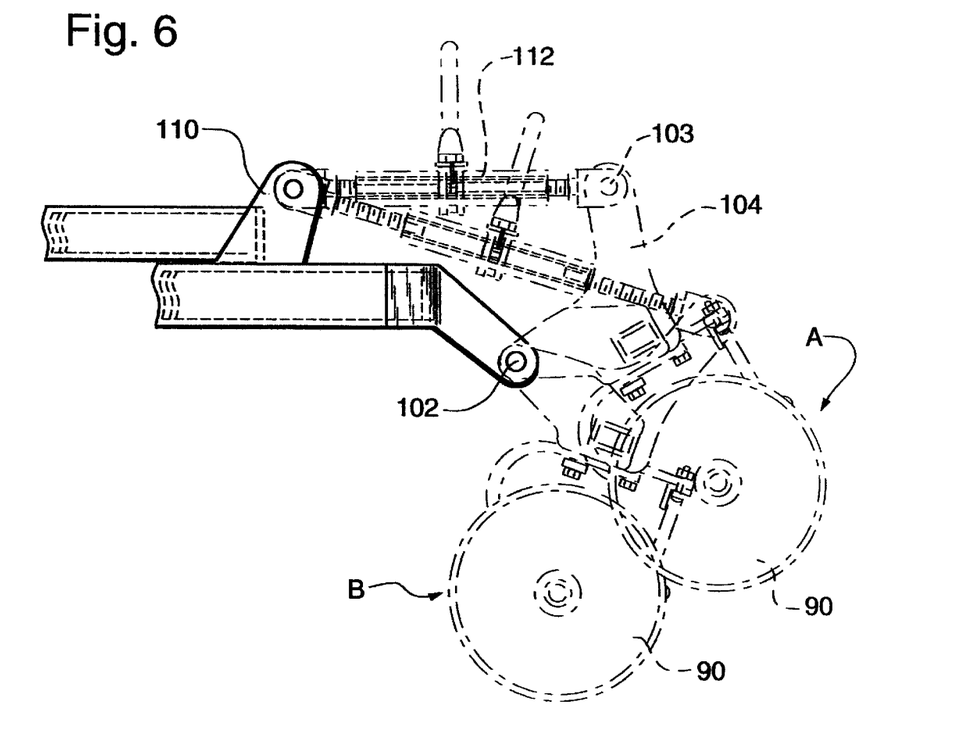
FIG. 6 is a view, similar to FIG. 5, showing in phantom various positions of the leveling disks between raised and lowered positions.

FIG. 4 shows one of the two leveling disk gangs arranged at the rear of the machine, as seen in FIG. 1. Except for the blades and a few other structural elements as will be described and made evident below, the rear gangs are in all essential respects the same as the front cutting disk gangs described above. More particularly, the disks 90–94 are rotatably assembled on a central shaft 96 with interspaced spools 97. The disk assembly is likewise affixed to a rear gang tube 100 and adapted for rotation, or vertical adjustment, thereabout via pivot points 101 and 102. This adjustment is best seen in FIGS. 5 and 6. Rocker arm 104 is pivotally attached to frame member 17 with pivot points 102 and 106. Rocker arm 104 is also attached to tab 110 via turnbuckle 112, such that shortening the turnbuckle raises the disks (see position A in FIG. 6) while lengthening the turnbuckle lowers the disks (see position B in FIG. 6).

Disks 90–94 are all deep concavity leveling disk blades which allows them to maximize lateral soil throw while minimizing the depth of penetration required. Deep concavity is defined by the ratio R/D<1.3, where R is the radius of curvature and D is the diameter, both of the disk blade. By moving the proper amount of soil laterally without running deep, this configuration optimizes surface finish without the appearance of deep grooves and re-compacting soil due to back wall disk blade pressure. These leveling blades also continue to diminish the size of the soil aggregate created by the tillage points, mix residue through the tillage soil profile, and level the field surface to minimize or eliminate the need for subsequent leveling passes. Adjacent to the inner and outermost disk blade on either side is a step down on the diameter of approximately 2 inches. The inner and outermost disk blade on either side is a step down on the diameter of approximately 4 inches. These step down blades provide proper feathering of soil to create a level surface finish, regardless of speed and soil type.

The disk gangs 80 and 81 have their working surfaces facing inward toward the centerline of the implement, i.e., the outermost disk in each assembly trails the innermost disk when the implement is being pulled through the field.

The rear row of leveling disk gangs may advantageously include small crimp center blades and cast spools to allow for maximum clearance between blades for flow of soil and residue. The rear leveling disk gang has an independent depth adjustment relative to the shanks or cutting disk gangs that is accomplished by mechanical screw adjust. A drag harrow or rotary reel can be used with any of the above combinations to improve field surface finish and eliminate subsequent leveling passes allowing direct planting.

The two disk gangs 80 and 81 are each optimally set at a working angle in the range of 15° to 17°, preferably 16° (see angle D in FIG. 1).

Large crimp center blades and cast spools, 6-inch diameter spools, for example, on the front cutting gangs provide strength and knock down residue, while small crimp center blades and cast spools, 4½ inch diameter spools, for example, on the leveling gangs give maximum clearance between blades for flow of soil and residue.

Combining the front shallow concavity cutting disk blades with deeper concavity rear leveling disk blades provides optimal cutting and mixing of soil and crop residues in the tillage profile along with unsurpassed leveling. The shallow concavity cutting disk blades additionally provide unparalleled residue flow, preventing plugging and bunching. The deep concavity leveling disks promote aggressive soil rolling and clod sizing for better seedbed conditioning and residue coverage. All of this is accomplished regardless of the speed within the range of 4 to 7.5 mph. This arrangement also allows for a 2 mph working range without requiring adjustment of the relative disk blade settings. The step down or feathering blades combined with the shallow concavity front disk blades and the deeper concavity rear leveling disk blades assist in creating a very level profile at speeds from 4 to 7.5 mph.

To set up the implement for use in the field and then adjust it for optimal operations, the operator will first level the implement and set the shank depth to achieve soil fracture appropriate for the crops to be planted. Then, the operator must set the front disk depth to achieve optimal residue cutting and mixing, usually in the range of 3 to 5 inches. Setting the front disk blades too deeply will increase horsepower requirements as well as move too much soil outwardly, resulting in ridging at the outside of the machine swath and a non-uniform seedbed. Setting the front disk blades too shallow will not allow the soil and residue to mix thoroughly, resulting in a non-uniform seedbed and a ridge in the center of the machine swath. The rear disk depth is then set to level the surface and properly size the clods. The depth of the leveling gangs should be just deep enough to fill any furrows left by the front disk gangs. Setting the rear disk gangs too deep will cause disk grooving behind each blade and a ridge will be formed in the center of the machine swath. Setting the rear disk blades too shallow will cause ridging along the outside edges of the machine swath, and a valley will be left at the center of the machine. This set up will produce even point penetration and wear.

Many conventional elements or accessories known and used under normal circumstances have not be shown or discussed, but certainly would be employed under normal operating or transport conditions. For instance, this machine would normally have a jack stand attached near the forward end thereof to support the tongue when not connected to a tractor. Other items fitting this category are safety chains, SMV signs, warning lights, locking pins, disk scrapers, shear bolts, and the like.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. For instance, as on of skill in this technology will readily understand, the turnbuckles shown and described may be replaced with hydraulic cylinders, operated and connected in a conventional manner, depending upon working conditions and operator preferences. Accordingly, the following claims are intended to protect the invention broadly as well as in the specific form shown.

Having thus described the invention, what is claimed is:

1. A tillage implement comprising:
    a rigid main frame having a front end, an opposing rear end and opposing first and second sides extending therebetween, said main frame being generally horizontal in a plane parallel to the surface of the ground and having a fore-and-aft centerline;
    a hitch having one end connected to the front end of said main frame and an opposite forward end adapted to be connected to a towing vehicle;
    front and rear pairs of disk gangs mounted on said main frame for working the soil as the implement is pulled across a field by a towing vehicle, each said gang having an elongated axis about which said disks may freely rotate, each said pair of gangs being generally symmetrically arranged relative to said centerline;
    said front and rear pairs of gangs each including a left gang and a right gang each supported by a separate subframe such that respective said elongated axis of said gangs are selectively adjustable vertically in a direction generally perpendicular to the plane of said main frame and each of said gangs in said front pair set at a working angle in the range of 17° to 19°;
    a plurality of chisel plow units affixed to said main frame between said front and rear pairs of gangs regular intervals between said first and second sides;
    the disk blades on said front pair of disk gangs being shallow concavity cutting disk blades having the ratio R/D>1.5, where R is the radius of curvature, and D is the diameter, both of the disk blade; and
    the disk blades on said rear pairs of disk gangs being deep concavity leveling disk blades having the ratio R/D<1.3, where R is the radius of curvature, and D is the diameter, both of the disk blade.

2. The tillage implement of claim 1, wherein:
    said each of said gangs in said rear pair are set at a working angle in the range of 15° to 17°.

3. The tillage implement of claim 2, wherein:
    the disk on each said front pair of gangs farthest from said centerline has a diameter approximately 2 inches less than the other disks on said front pair of gangs.

4. The tillage implement of claim 3, wherein:
    said subframe supporting each said pair of front gangs is independently adjustable vertically relative to said shank assemblies and said rear pair of gangs by a mechanical ratchet mechanism interconnecting said respective subframe and said main frame.

5. The tillage implement of claim 3, wherein:
    said subframe supporting each said pair of front gangs is independently adjustable vertically relative to said shank assemblies and said rear pair of gangs by a hydraulic cylinder interconnecting said respective subframe and said main frame.

6. The tillage implement of claim 3, wherein:
    said rear pair of gangs form an angle with a plane perpendicular to said centerline such that the disks on said rear pair of gangs farthest from said centerline trail the disks closest to said centerline.

7. The tillage implement of claim 6, wherein:
    the distance between said disks on said rear pair of gangs farthest from said centerline is greater than the distance between said disks on said front pair of gangs farthest from said centerline.

8. The tillage implement of claim 7, wherein:
    said main frame is supported by a pair of spaced-apart wheel assemblies, each pivotably connected to said main frame by a wheel arm, each said wheel arm further connected to said main frame by a hydraulic cylinder whereby actuation of said hydraulic cylinders selectively raises or lowers said main frame relative to the ground, thereby adjusting the vertical positioning of said shanks.

9. In a tillage implement having a wheeled main frame with a fore-and-aft centerline, front and rear pairs of disk gangs mounted on said main frame for working the soil as the implement is pulled across a field by a towing vehicle, and depth adjustment mechanisms for raising and lower the gangs relative to the frame, the improvement comprising:
    each said gang having an elongated axis about which said disks may freely rotate, each said pair of gangs being generally symmetrically arranged relative to said centerline;
    said front and rear pairs of gangs each including a left gang and a right gang each supported by a separate subframe such that respective said elongated axis of said gangs are selectively adjustable vertically;
    a plurality of deep chisel plow units adjustably affixed between said front and rear pairs of gangs for selective vertical movement relative to said main frame at regular intervals between said first and second sides;
    the disk blades on said front pair of gangs being shallow concavity cutting disk blades having the ratio R/D>1.5, where R is the radius of curvature, and D is the diameter, both of the disk blade; and
    the disk blades on said rear pairs of gangs being deep concavity leveling disk blades having the ratio R/D<1.3, where R is the radius of curvature, and D is the diameter, both of the disk blade.

10. The tillage implement of claim 9, wherein:
    said elongated axis of said front pair of gangs each form a working angle in the range of 17° to 19°.

11. The tillage implement of claim 10, wherein:
    the disk on each said front pair of gangs farthest from said centerline has a diameter approximately 2 inches less than the other disks on said front pair of gangs.

12. The tillage implement of claim 11, wherein:
    said subframe supporting each said pair of front gangs is independently adjustable vertically relative to said shank assemblies and said rear pair of gangs by a mechanical ratchet mechanism interconnecting said respective subframe and said main frame.

13. The tillage implement of claim 11, wherein:
    said subframe supporting each said pair of front gangs is independently adjustable vertically relative to said shank assemblies and said rear pair of gangs by a hydraulic cylinder interconnecting said respective subframe and said main frame.

14. The tillage implement of claim 11, wherein:
    said rear pair of gangs form an angle with a plane perpendicular to said centerline such that the disks on said rear pair of gangs farthest from said centerline trail the disks closest to said centerline.

15. The tillage implement of claim 14, wherein:
    the distance between said disks on said rear pair of gangs farthest from said centerline is greater than the distance between said disks on said front pair of gangs farthest from said centerline.

16. The tillage implement of claim 15, wherein:
    said main frame is supported by a pair of spaced-apart wheel assemblies, each pivotably connected to said main frame by a wheel arm, each said wheel arm further connected to said main frame by a hydraulic cylinder whereby actuation of said hydraulic cylinders selectively raises or lowers said main frame relative to the ground.

17. The tillage implement of claim 16, wherein:
each of said gangs in said rear pair are set at a working angle in the range of 15° to 17°.

* * * * *